US009106475B2

(12) United States Patent  
Matsumura (10) Patent No.: US 9,106,475 B2
(45) Date of Patent: Aug. 11, 2015

(54) PROTOCOL CONVERSION DEVICE AND PROTOCOL CONVERSION METHOD

(71) Applicant: Sony Corporation, Tokyo (JP)

(72) Inventor: Hiroaki Matsumura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 13/840,524

(22) Filed: Mar. 15, 2013

(65) Prior Publication Data

US 2013/0272317 A1 Oct. 17, 2013

(30) Foreign Application Priority Data

Apr. 11, 2012 (JP) .................................. 2012-090087

(51) Int. Cl.
*H04L 29/06* (2006.01)
*H04L 29/08* (2006.01)

(52) U.S. Cl.
CPC ...... *H04L 29/06068* (2013.01); *H04L 67/2823* (2013.01); *H04L 69/08* (2013.01); *H04L 69/18* (2013.01)

(58) Field of Classification Search
CPC .................. H04L 29/06068; H04L 67/2823; H04L 69/08; H04L 69/18
USPC ................................................. 370/466, 467
See application file for complete search history.

(56) References Cited

U.S. PATENT DOCUMENTS

| | | | | |
|---|---|---|---|---|
| 2006/0253598 A1* | 11/2006 | Nakamura et al. | ............ | 709/230 |
| 2007/0107028 A1* | 5/2007 | Monroe et al. | ................ | 725/105 |
| 2009/0080461 A1* | 3/2009 | Barri et al. | ..................... | 370/466 |
| 2012/0017253 A1* | 1/2012 | Hicks et al. | ................... | 725/114 |
| 2012/0314018 A1* | 12/2012 | Wengrovitz et al. | ....... | 348/14.08 |

FOREIGN PATENT DOCUMENTS

JP 2007-312123 11/2007

* cited by examiner

*Primary Examiner* — Gary Mui
(74) *Attorney, Agent, or Firm* — Hazuki International, LLC (57) ABSTRACT

A protocol conversion device includes: a first protocol control unit transmitting/receiving first protocol data using a first protocol with information corresponding to a set operation mode to/from a first electronic device connected to a relay device and in which connection adjustment is performed by the first protocol; and a second protocol control unit converting second protocol data received through the relay device from a second electronic device connected to the relay device and in which communication is performed by a second protocol into the first protocol data to transmit the data to the first protocol control unit, and converting the first protocol data received by the first protocol control unit through the relay device into the second protocol data to transmit the data to the second electronic device.

5 Claims, 4 Drawing Sheets

PROTOCOL CONVERSION DEVICE AND PROTOCOL CONVERSION METHOD

FIELD

The present disclosure relates to a protocol conversion device and a protocol conversion method transmitting/receiving data between electronic devices, for example, by converting different protocols.

BACKGROUND

There are cameras (for example, a high-speed imaging camera and so on) and controllers for cameras as electronic devices developed by various manufacturers in related art. Additionally, a camera network system which can be controlled by an operator by connecting cameras to a network for controlling a plurality of cameras arranged at plural points has been developed. Accordingly, the opportunity of using cameras developed by different manufacturers at the same time is increasing in the camera network system.

However, protocols for controlling cameras differ according to manufacturers. Accordingly, when cameras developed by different manufacturers are mixed in the camera network system, it is necessary to operate cameras by using controllers recommended by respective manufacturers. Here, a technology of selecting one protocol from plural protocols disclosed in JP-A-2007-312123 (Patent Document 1) is known.

In Patent Document 1, there is disclosed the technology in which one protocol is selected from plural protocols based on switching information.

SUMMARY

Incidentally, there is a case where a camera developed by a certain manufacturer (a first manufacturer) is controlled by a controller developed by a different manufacturer (a second manufacturer) in the camera network system. Although complicated session management (hereinafter referred to as "connection adjustment") is performed between the camera and a controller manufactured by the first manufacturer, a protocol for performing the connection adjustment is not published. Accordingly, it is difficult that the controller manufactured by the second manufacturer controls the camera manufactured by the first manufacturer. Here, a method has been considered in which a protocol conversion device is provided between the camera and the controller to convert protocols of control commands or control results by the protocol conversion device. However, when merely using the protocol conversion device for performing communication between the camera and the controller, the connection adjustment may become complicated and it may be difficult to perform satisfactory operation.

In view of the above, it is desirable to control electronic devices controlled by different protocols easily.

According to an embodiment of the present disclosure, a first protocol control unit transmits/receives first protocol data using a first protocol with information corresponding to a set operation mode to/from a first electronic device connected to a relay device and in which connection adjustment is performed by the first protocol. A second protocol control unit converts second protocol data received through the relay device from a second electronic device connected to the relay device and in which communication is performed by a second protocol into the first protocol data to transmit the data to the first protocol control unit, and converts the first protocol data received by the first protocol control unit through the relay device into the second protocol data to transmit the data to the second electronic device.

According to the embodiment of the present disclosure, the protocol data is converted to each other between the first electronic device and the second electronic device. At this time, the first protocol data using the first protocol is transmitted/received with information corresponding to the set operation mode. Accordingly, the first electronic device receiving the first protocol data recognizes the protocol conversion device as a transmission source of the first protocol data as a particular device in the first electronic device. Accordingly, it is possible to easily control the first electronic device and the second electronic device to each other seamlessly not depending on the difference of protocols.

DETAILED DESCRIPTION

Hereinafter, a mode for carrying out the present disclosure (hereinafter referred to as an embodiment) will be explained. The explanation will be made in the following order.

1. Embodiment (Example of Transmission Processing of First Protocol Data)
2. Modification Example

1. Embodiment

Example of Transmission Processing of First Protocol Data

Hereinafter, an embodiment of the present disclosure will be explained with reference to attached drawings. In the embodiment, an example in which the present disclosure is applied to a protocol conversion device 4 converting different protocols to each other in a camera network system 1 controlling a plurality of cameras will be explained. The protocol conversion device 4 realizes a protocol conversion method performed by later-described internal blocks in cooperation with one another by a computer mounted on the protocol conversion device 4 executing a program. In the following explanation, data transmitted/received by using the n-th protocol is called "the n-th protocol data ("n" is an integer).

Figure 1:
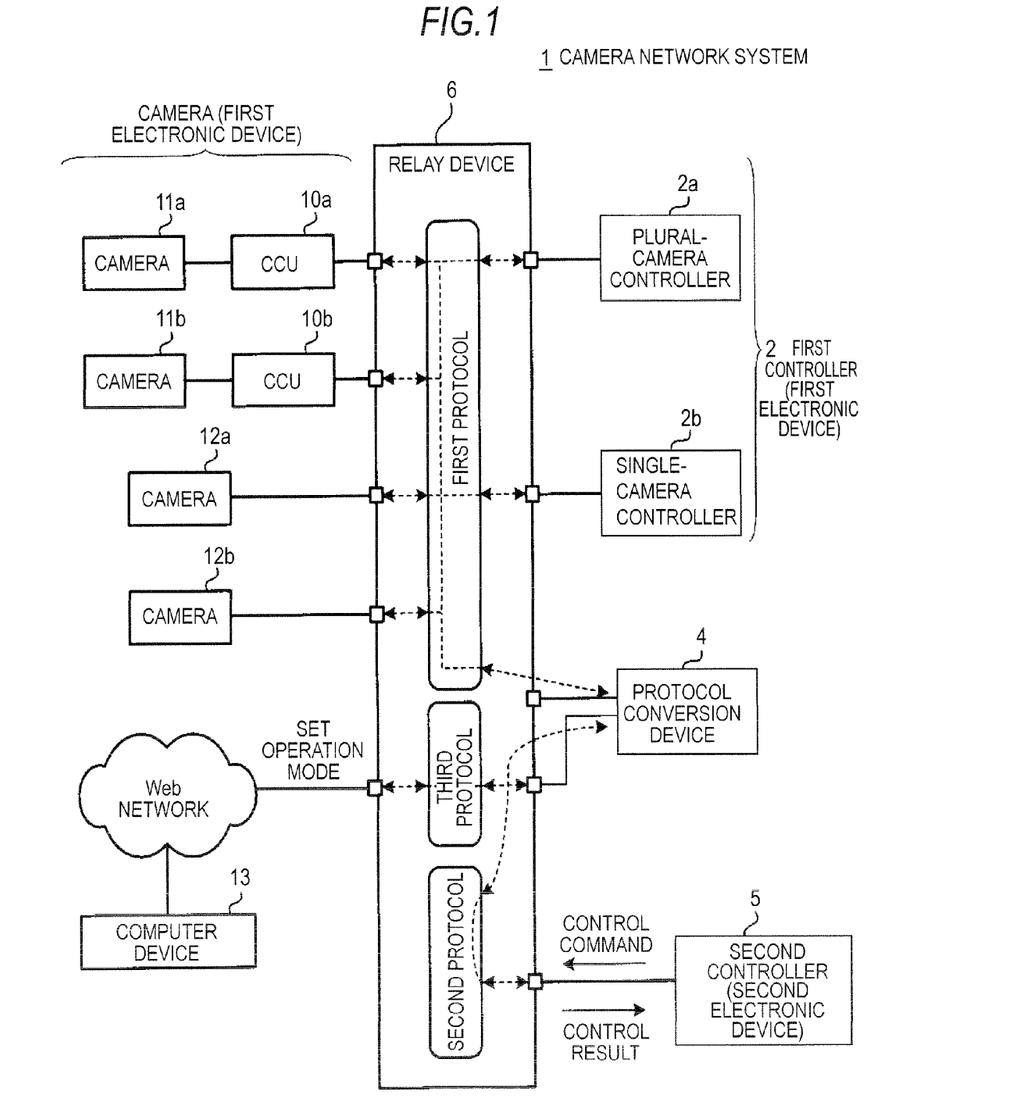
FIG. 1 is a network connection diagram showing a configuration example of a camera network system according to an embodiment of the present disclosure.

FIG. 1 is a network connection diagram showing a configuration example of the camera network system 1.

The camera network system 1 includes a plural-camera controller 2a capable of controlling a plurality of cameras, a single-camera controller 2b capable of controlling one camera and the protocol conversion device 4 capable of converting a first protocol data and a second protocol data to each other. In the following explanation, the plural-camera controller 2a and the single-camera controller 2b are collectively called a "first controller 2". Broken lines in the drawing represent transmission paths of data such as control commands and control results.

The camera network system 1 includes a second controller transmitting control commands by the second protocol data and a relay device 6 relaying first to third protocol data. As the relay device 6, for example, a network hub is used. The camera network system 1 also includes cameras 11a, 11b and cameras 12a, 12b connected to the relay device 6 and operations of which are controlled by the first controller 2 or the second controller 5. Camera control units (CCU) 10a and 10b are arranged between the cameras 11a, 11b and the relay device 6. The camera control units 10a and 10b perform detailed operation setting of the cameras 11a and 11b.

The above plural-camera controller 2a simultaneously controls the cameras 11a and 11b through the camera control units 10a and 10b or simultaneously controls the cameras 12a and 12b. The single-camera controller 2b controls either of the cameras 12a and 12b.

The camera network system 1 also includes a computer device 13 connected to the relay device 6 through a Web network and setting various modes of the protocol conversion device 4. The setting of modes is performed by the computer device 13 with respect to the protocol conversion device by using a third protocol. As the third protocol, for example, an HTTP (Hyper Text Transfer Protocol) is used. In the following explanation, the camera control units 10a, 10b and the cameras 11a, 11b, 12a and 12b are collectively called the "camera". The first controller 2 and the camera are used as a "first electronic device" transmitting/receiving the first protocol data, and the second controller 5 is used as a "second electronic device" transmitting/receiving the second protocol data.

When using the protocol conversion device 4, the protocol conversion device 4 can be recognized as the camera to be controlled by the second controller 5. Conversely, the control actually performed by the second controller 5 is recognized by the camera as if it were performed by the first controller 2. Naturally, the camera can be controlled also by the first controller 2 as in related art.

[Contents of First and Second Protocol Data]

Here, the first and second protocol data will be explained.

The first protocol data is used for connection adjustment performed between the first controller 2 and the camera. The first protocol data includes, for example, fields of address information, address control, an actual-control command and a checksum.

The second protocol data is used by the second controller 5. The second protocol data is obtained by extracting binary data of the actual-control command field from the first protocol data and mapping the binary data on data in a text format.

When a second protocol control unit 25 (refer to FIG. 2 described later) provided in the protocol conversion device 4 converts the first protocol data into the second protocol data, respective fields of address information, address control and the checksum are deleted. Then, the binary data extracted from the actual-control command field is converted into the text format.

Accordingly, the second protocol data is obtained by reducing information included in the first protocol data. Therefore, complicated connection adjustment performed by using the first protocol data is not necessary for the second electronic device using the second protocol data, and it is just necessary to transmit/receive data in the simple text format.

When the binary data extracted from the actual-control command field by the second protocol control unit 25 is converted into the text format in units of bytes, the following processing is performed.

For example, assume that a character string of the binary data extracted from the actual-control command field in the binary format in the first protocol data is "20a901". At this time, the protocol conversion device 4 converts the binary data into "20, a9, 01" as a character string in a linefeed format in the second protocol data.

When the second protocol control unit 25 converts the second protocol data into the first protocol data, data in the text format is converted into binary data in the actual-control command field by the inverse procedure.

[Internal Configuration Example of Protocol Conversion Device]

Figure 2:
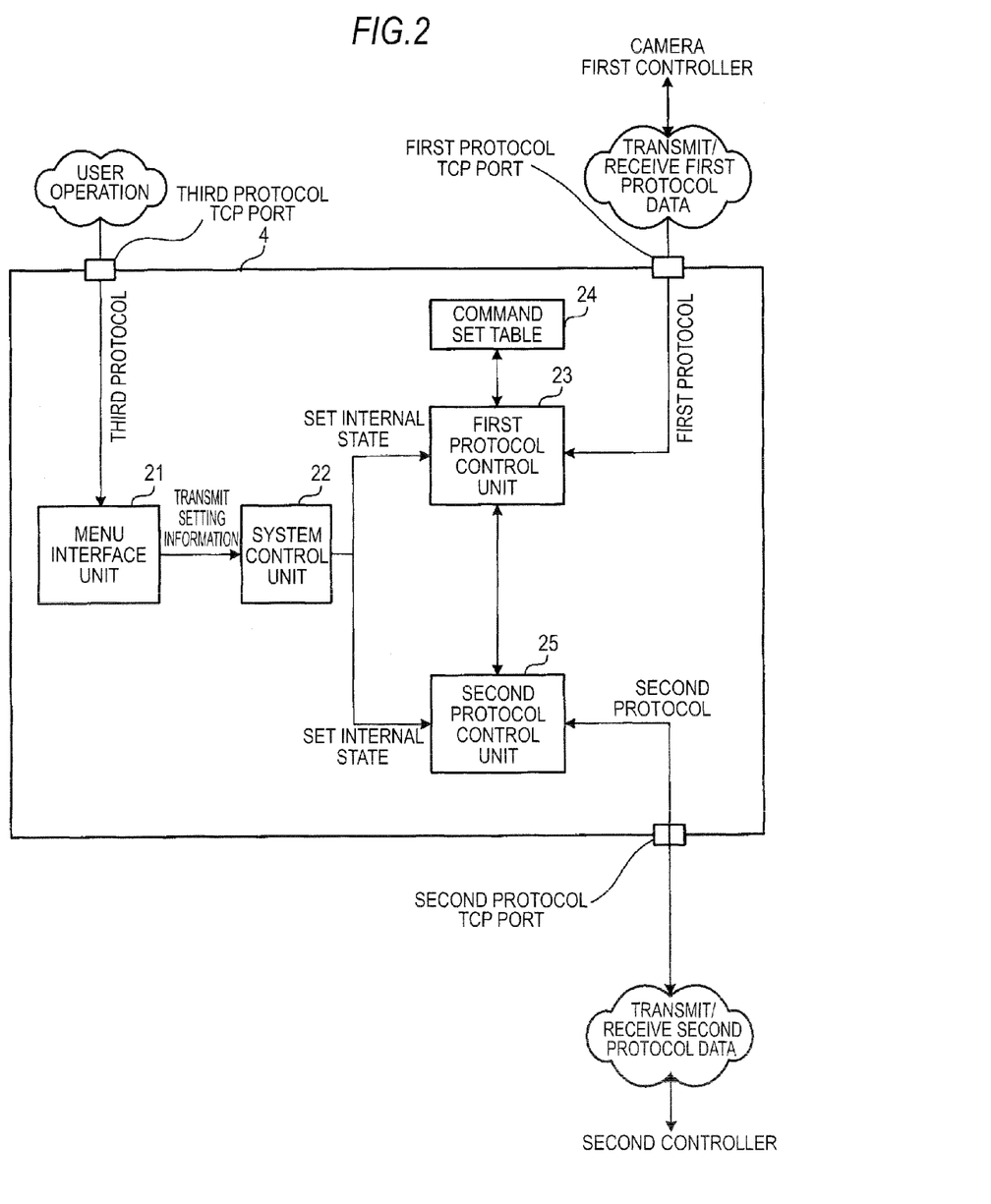
FIG. 2 is a block diagram showing an internal configuration example of a protocol conversion device according to the embodiment of the present disclosure.

FIG. 2 is a block diagram showing an internal configuration example of the protocol conversion device 4.

The protocol conversion device 4 includes a menu interface unit 21 receiving a user operation from the computer device 13 (refer to FIG. 1) and a system control unit 22 setting an operation mode of a first protocol control unit 23 and the second protocol control unit 25. The protocol conversion device 4 also includes the first protocol control unit 23, a command set table 24 recording plural sets of control commands as command sets and the second protocol control unit 25.

The menu interface unit 21 performs communication with the computer device 13 through a third protocol TCP port. Then, the menu interface unit 21 displays a setting menu for setting an operation mode of the protocol conversion device 4 on a display unit (not shown) of the computer device 13 and receives setting data inputted from the setting menu. The operation mode is set in the system control unit 22 by the third protocol data using the third protocol.

The setting information of the operation mode set by the computer device 13 through the menu interface unit 21 is transmitted to the system control unit 22, and the system control unit 22 is switched to the set operation mode. The system control unit 22 sets the operation mode of the first protocol control unit 23 and the second protocol control unit 25 based on the switched operation mode, performing control of activation and stop of the first protocol control unit 23 and the second protocol control unit 25. Then, the system control unit 22 performs control so that the first protocol control unit 23 and the second protocol control unit 25 operate in accordance with the set operation mode.

Here, the operation mode has a control mode in which the second controller 5 controls the operation of the camera or the first controller 2 and a camera mode as a device mode in which the second controller 5 operates as the camera or the first controller 2. The control mode has a single-device control mode in which the first protocol control unit 23 controls the operation of the single first electronic device (for example, the camera 12a) and a plural-device control mode in which the first protocol control unit 23 controls the operation of plural first electronic devices (for example, the cameras 11a and 11b). In the single-device control mode or the plural-device control mode, the second protocol control unit 25 converts the second protocol data received from the second controller 5 into the first protocol data to transmit the data to the first protocol control unit 23. In the camera mode, the second protocol control unit 25 converts the first protocol data received from the first protocol control unit 23 into the second protocol data to transmit the data to the second controller 5.

The first protocol control unit 23 transmits the first protocol data through the relay device 6 to the camera or the first controller 2 connected to the relay device 6 through a first protocol TCP port and in which the connection adjustment is performed by the first protocol. The first protocol control unit 23 receives the first protocol data from the camera or the first controller 2.

The second protocol control unit 25 transmits/receives the second protocol data to/from the second controller 5 through a second protocol TCP port. Here, the second protocol control unit 25 converts the second protocol data received from the second controller 5 through the relay device 6 into the first protocol data to transmit the data to the first protocol control unit 23. Then, the second protocol control unit 25 converts the first protocol data received by the first protocol control unit 23 through the relay device 6 into the second protocol data and transmits the data to the second controller 5.

[Operation Example of Protocol Conversion Device]

Here, an operation example of the protocol conversion device 4 will be explained.

The protocol conversion device 4 converts the first protocol data received from the first controller or the camera into the second protocol data and transmits the second protocol data to the second controller 5. The first protocol data includes, for example, control commands or control results. Here, the protocol conversion device 4 converts a control command having a complicated structure into a control command having a possibly simpler structure at the time of converting the first protocol data into the second protocol data.

The protocol conversion device 4 converts the control command of the second protocol data received from the second controller 5 into the first protocol data, and transmits the first protocol data to the first controller 2 or the camera.

All the connection adjustment using the first protocol data is performed by the protocol conversion device 4. Accordingly, the second controller 5 does not concern the complicated processing performed in the first protocol data. That is, the second controller 5 can indirectly communicate with the camera connected to the relay device 6 just by transmitting/receiving the control command created by the second protocol data with respect to the protocol conversion device 4. Accordingly, the second controller 5 can participate in the camera network system 1 as if the second controller 5 were the first controller 2. Additionally, as complicated session processing is omitted in the second protocol, items necessary for operation of the camera can be controlled by using the second protocol data.

Here, the first protocol control unit 23 adds information corresponding to the set operation mode to the first protocol data, transmitting/receiving the first protocol data with respect to the camera or the first controller 2 connected to the relay device 6 and in which connection adjustment is performed by the first protocol. At this time, the first protocol control unit 23 changes the control commands into a command set which can be used by the first protocol control unit 23 so as to correspond to each operation mode set by the computer device 13. Here, the command set is a group of plural control commands to be set according to the operation mode including, for example, a single-device set, a plural-device set and a camera set. These command sets include the following control commands. These command sets are recorded in the command set table 24.

(1) Single-Device Set

Camera control, Network system control and Control permission control (2) Plural-Device Set Camera control, Network system control, Control permission control, Camera selection and Panel assignment control (3) Camera Set Camera control, Network system control "Network system control" included in the command sets is a control command not contributed to the control of cameras, which is used for, for example, instructing the camera to light up a not-shown control lamp. Additionally, "Control permission control" is used when a plurality of single-camera controllers 2b each controlling one camera (for example, the camera 12a) are installed. At this time, priority control is performed so that plural operators do not perform a plurality of the single-camera controllers 2b at the same time to thereby avoid collision of control commands.

Moreover, "Camera selection" is used for determining which cameras are selected as control targets from many cameras in the plural-device control mode. Furthermore, "Panel assign control" is used for determining which camera is assigned as the control target in the selected cameras in the plural-device control mode.

As described later, the electronic device which has received the command set from the protocol conversion device 4 recognizes the electronic device corresponding to the command set as the device which has transmitted the command set. For example, the camera which has received the single-device set recognizes the single-camera controller 2b as the device which has transmitted the command set. Similarly, when the electronic device connected to the relay device 6 receives the plural-device set from the protocol conversion device 4, the electronic device recognizes the plural-camera controller 2a as the device which has transmitted the command set, and the electronic device recognizes the camera as the device which has transmitted the command set when receiving the camera set.

Figure 3A:
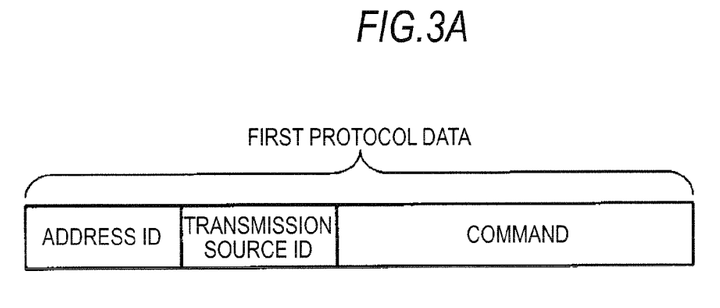
FIGS. 3A and 3B show configuration examples of first protocol data processed by a first protocol control unit according to the embodiment of the present disclosure.
Figure 3B:
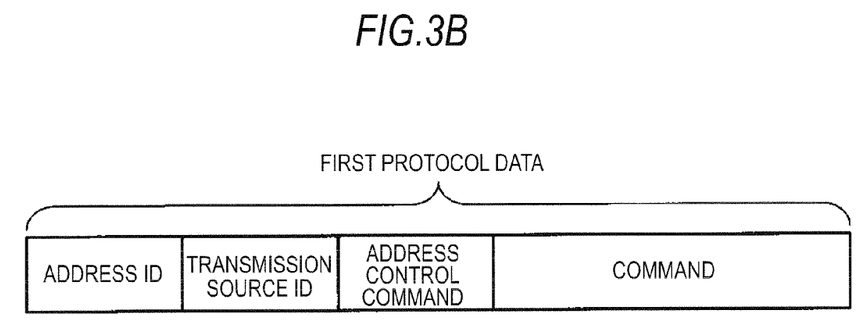

FIGS. 3A and 3B show configuration examples of the first protocol data processed by the first protocol control unit 23. FIG. 3A shows a configuration example of the first protocol data used in the camera mode and in the single-device control mode and FIG. 3B shows a configuration example of the first protocol data used in the plural-device control mode.

The first protocol data shown in FIG. 3A is used by the first protocol control unit 23 set in the camera mode or the single-device control mode. The first protocol data includes fields of an address ID, a transmission source ID and a command.

The first protocol data shown in FIG. 3B is used by the first protocol control unit 23 set in the plural-device control mode. The first protocol data includes fields of an address ID, a transmission source ID, an address control command and a command.

In the address ID field, information indicating the operation mode corresponding to the electronic device as a transmission destination of the first protocol data is stored. In the present embodiment, information indicating any of the camera, the plural-camera controller 2a and the single-camera controller 2b is stored. The first protocol control unit 23 sets information of the address ID of the "single-device control" when the set operation mode is the single-device control mode, the address ID of the "plural-device control" when the set operation mode is the plural-control mode and the address ID of the "camera" when the set operation mode is the camera mode with respect to all the first protocol data. Then, the first protocol control unit 23 transmits the first protocol data to the camera, the plural-camera controller 2a or the single-camera controller 2b.

In the transmission ID field, information of the operation mode set in the first protocol control unit 23 is stored. In the command field, information of various control commands is stored.

In the address control command field, information specifying the first electronic device as a transmission destination of the control command is stored. For example, when only the camera 12*a* is the transmission destination of the control command, information identifying the camera 12*a* is stored in the address control command field.

[Example of Processing Performed by Protocol Conversion Device]

Next, a processing example performed by the protocol conversion device 4 will be explained.

Figure 4:
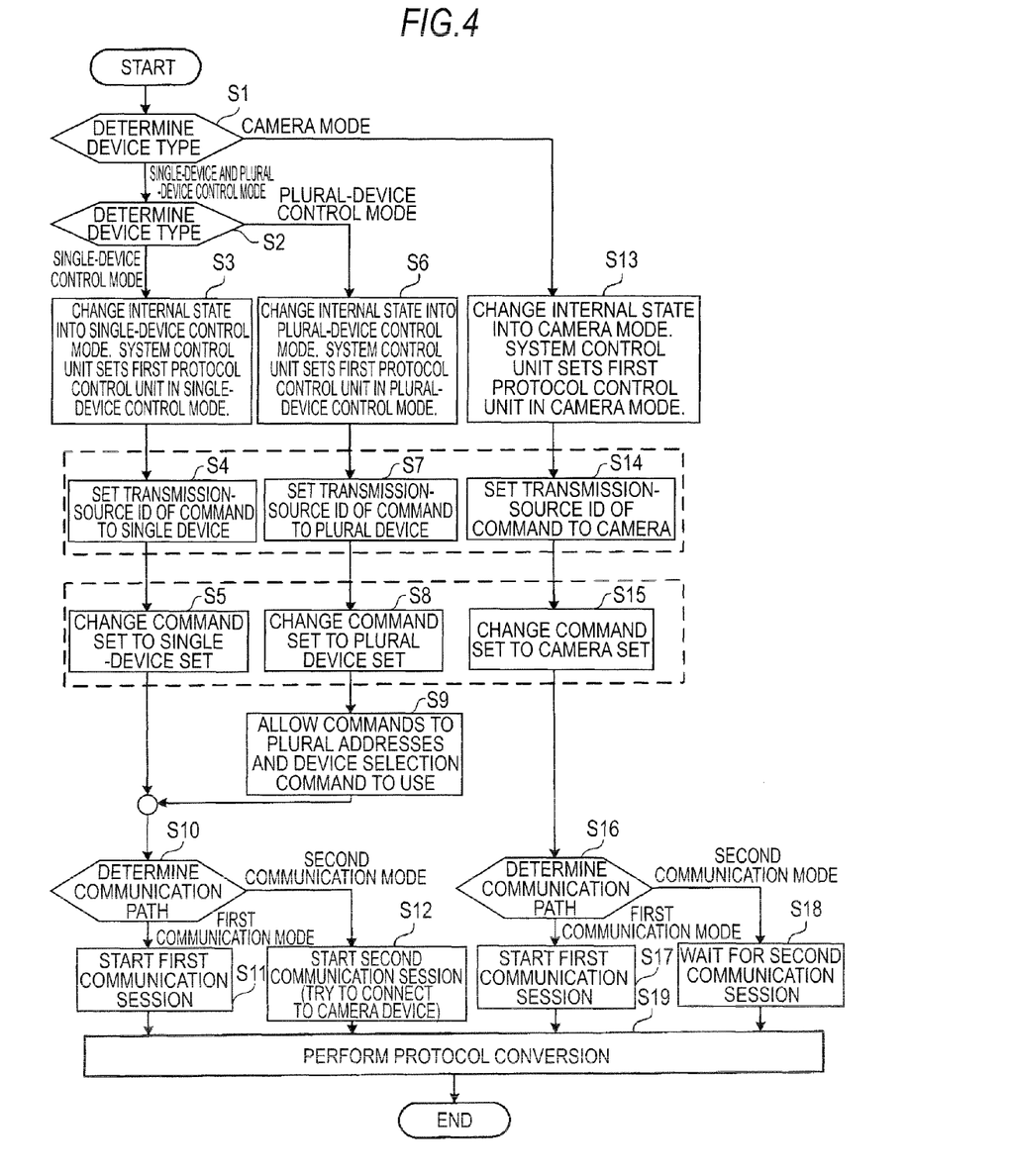
FIG. 4 is a flowchart showing a processing example of creating command sets performed by the first protocol control unit according to the embodiment of the present disclosure.

FIG. 4 is a flowchart showing a processing example of creating command sets performed by the protocol conversion device 4.

First, the system control unit 22 determines a device type set by the computer device 13 (Steps S1 and S2). Here, the device type indicates a kind of the electric device acted by the protocol conversion device 4 with respect to another electronic device, which corresponds to the operation mode in the present embodiment.

In Step S1, when the camera mode is set in the device type, the processing proceeds to Step S13. In Step 2, when the single-device control mode is set in the device type, the processing proceeds to Step S3 and when the plural-device control mode is set in the device type, the processing proceeds to Step S6.

In Step S2, when the system control unit 22 determines that the single-device control mode is set by the computer device 13, the system control unit 22 changes an internal state into the single-device control mode and sets the first protocol control unit 23 in the single-device control mode (Step S3). Here, the internal state of the system control unit 22 is fixed by each operation mode, and a program and the like for controlling the first protocol control unit 23 and the second protocol control unit 25 are activated based on the changed operation mode.

Then, the first protocol control unit 23 sets transmission-source ID field of the control command "single-device" (Step S4) and changes the command set to the single-device set by referring to the command set table 24 (Step S5).

In Step S2, when the system control unit 22 determines that the plural-device control mode is set by the computer device 13, the system control unit 22 changes an internal state into the plural-device control mode and sets the first protocol control unit 23 in the plural-device control mode (Step S6). Then, the first protocol control unit 23 sets the transmission-source ID field of the control command to "plural device" (Step S7) and changes the command set to the plural-device set by referring to the command set table 24 (Step S8).

Furthermore, the first protocol control unit 23 allows plural addresses (for example, the cameras 11*a* and 11*b*) to use the control commands and the camera selection command as the internal state is the plural-device control mode (Step S9). Due to the camera selection command, the second controller 5 can control plural cameras as the plural-camera controller 2*a*.

After Step S5 and S9, the first protocol control unit 23 determines a communication path for transmitting the command set (Step S10). In the present embodiment, communication of the first protocol data is performed through the communication path set in either of first and second communication modes.

The first protocol control unit 23 starts a first communication session in the first communication mode when performing communication with the first controller 2 by the communication path set in the first communication mode (Step S11). As the first communication session, for example, a session in a proprietary standard is used.

On the other hand, the first protocol control unit 23 starts a second communication session in the second communication mode when performing communication with the first controller 2 by the communication path set in the second communication mode (Step S12). As the second communication mode, for example, a TCP/IP session is used.

When the communication session is started after Step S11 or Step S12, the second protocol control unit 25 performs protocol conversion between the first protocol data and the second protocol data (Step S19). After that, the first protocol data obtained by converting the second protocol data is communicated in the determined communication mode.

In Step 1, when the system control unit 22 determines that the camera mode is set by the computer device 13, the system control unit 22 changes the internal state into the camera mode and sets the first protocol control unit 23 in the camera mode (Step S13). Then, the first protocol control unit 23 sets the transmission-source ID field of the control command to the "camera" (Step S14) and changes the command set to the camera set by referring to the command set table 24 (Step S15).

Next, the first protocol control unit 23 determines the communication path for transmitting the command set (Step S16). The first protocol control unit 23 starts the first communication session in the first communication mode when performing communication with the first controller 2 by the communication path set in the first communication mode (Step S17). On the other hand, the first protocol control unit 23 waits for the second communication session in the second communication mode when performing communication with the first controller 2 by the communication path set in the second communication mode (Step S18).

When the communication session is started after Step S17 or Step S18, the second protocol control unit 25 performs protocol conversion between the first protocol data and the second protocol data (Step S19). After that, the first protocol data obtained by converting the second protocol data is communicated in the determined communication mode.

In the above case, as the first protocol control unit 23 is set in the single-device control mode or the plural-device control mode, the connection to the camera as a controlled device is actively tried in Step S11 and S12. On the other hand, as the first protocol control unit 23 is set in the camera mode, the first protocol control unit 23 passively waits for a connection request from the first controller 2 in Step S18.

As described above, for example, when the camera is connected to the relay device 6 as the first electronic device corresponding to the first protocol, the first protocol control unit 23 transmits information of the device type indicating that the first electronic device connected to the relay device 6 is the camera to the protocol conversion device 4. Also, the protocol conversion device 4 transmits information of the device type indicating that the second electronic device connected to the relay device 6 is the second controller 5 to the protocol conversion device 4. Accordingly, the first protocol control unit 23 determines what kind of electronic device is connected to the relay device 6 and sorts out the contents of the control commands to be transmitted to the first electronic device. Therefore, the protocol conversion device 4 is seen like the second controller 5 from the camera, and the protocol conversion device 4 is seen like the camera from the second controller 5.

In the protocol conversion device 4 according to the embodiment of the present disclosure described above, the first protocol control unit 23 adds information corresponding to the set operation mode to the first protocol data and transmits the first protocol data to the first electronic device. Accordingly, the camera or the first controller 2 connected to the protocol conversion device 4 recognizes the protocol conversion device 4 as a particular device in the first electronic device corresponding to the first protocol. At this time, as the protocol conversion device 4 acts like the first controller 2 or the camera with respect to the second controller 5, the second controller 5 can be operated as usual. On the other hand, as the protocol conversion device 4 acts like the first controller 2 with respect to the camera, the camera is operated as usual.

The protocol conversion device 4 returns the first protocol data with the information of the device type to the camera or the first controller 2 connected to the relay device 6. Accordingly, the camera or the first controller 2 determines the protocol conversion device 4 as a normal camera or the first controller 2, exchanging commands which are the same as commands at normal operation. Here, it is not necessary that the camera or the first controller 2 connected to the relay device 6 changes the commands and so on even when the protocol conversion device 4 is connected to the relay device 6. Accordingly, it is possible to allow the protocol conversion device 4 to participate in the camera network system 1 by using normal setting.

Here, the address ID transmitted by the protocol conversion device 4 includes information of the device type for identifying the type of the electronic device. It is possible to previously set which device type information is included in the address ID to be transmitted. For example, the protocol conversion device 4 is recognized as the single-camera controller 2b when the "single-device control" is set, and the protocol conversion device 4 is recognized as one camera when the "camera" is set. As the protocol conversion device 4 acts so as to correspond to plural types of devices as described above, it is possible to respond to various applications.

Additionally, the second protocol control unit 25 converts the first protocol data and the second protocol data to each other. Accordingly, the second controller 5 can control the camera connected to the protocol conversion device 4 and performing communication by the first protocol data by using the second protocol data. Therefore, it is possible to easily control between the camera or the first controller 2 and the second controller 5 seamlessly not depending on the difference in protocols.

2. Modification Example

In the above camera network system 1, the computer device 13 performs setting the operation mode through a Web network, however, it is also possible to set the operation mode by directly connecting the computer device 13 to the protocol conversion device 4.

Though the example in which the second controller 5 is connected to the relay device 6 as the second electronic device performing communication by using the second protocol has been explained, it is also preferable that the camera and the like performing communication by using the second protocol is connected as the second electronic device the operation of which is controlled by the first controller 2. In this case, as the protocol conversion device 4 acts like the camera with respect to the first controller 2, the first controller 2 can control the camera performing communication by using the second protocol as if performing control of the camera performing communication by using the first protocol.

The above-described camera network system 1 may be used for controlling a camera for monitoring or may be used for a camera for giving information of weather conditions. It is also preferable to control a camera platform on which the camera is installed by the second controller 5. Although the cameras 11a and 11b are controlled through the camera control units 10a and 10b, the cameras 11a and 11b may be controlled in a state of being directly connected to the relay device 6.

The series of processing in the above embodiment can be executed by hardware as well as executed by software. When the series of processing is executed by software, the series of processing can be executed by a computer in which a program included in the software is incorporated in dedicated hardware or a computer in which a program for executing various functions is installed. The program included in desired software may be installed in, for example, a general-purpose personal computer to be executed therein.

It is further preferable to supply a recording medium in which a program code of the software realizing functions of the above embodiment is recorded to the system or the device. It is naturally possible to realize the functions by a computer (or a control device such as a CPU) of the system or the device reading and executing the program code stored in the recording medium.

As the recording media for supplying the program code in the above case, for example, a flexible disc, a hard disc, an optical disc, a magneto optical disc, a CD-ROM, a CD-R, a magnetic tape, a nonvolatile memory card, a ROM and the like can be used.

The functions of the above embodiment are realized by executing the program code read by the computer. Additionally, the OS and the like operated on the computer perform part of or all the actual processing based on an instruction of the program code. The case where the functions of the above embodiment are realized by the processing is also included.

The present disclosure is not limited to the above embodiment and it is obvious that application examples and modification examples may occur insofar as they are within the scope of the gist of the present disclosure described in the appended claims.

The present disclosure may apply the following configurations.

(1) A protocol conversion device including a first protocol control unit transmitting/receiving first protocol data using a first protocol with information corresponding to a set operation mode to/from a first electronic device connected to a relay device and in which connection adjustment is performed by the first protocol, and a second protocol control unit converting second protocol data received through the relay device from a second electronic device connected to the relay device and in which communication is performed by a second protocol into the first protocol data to transmit the data to the first protocol control unit, and converting the first protocol data received by the first protocol control unit through the relay device into the second protocol data to transmit the data to the second electronic device.

(2) The protocol conversion device described in the above (1), further including a system control unit setting the operation mode of the first protocol control unit and the second protocol control unit, in which the first protocol control unit adds information indicating the operation mode to the first protocol data when the operation mode is set in a single-device control mode in which an operation of a single first electronic device is controlled or in a device mode in which the second electronic device is operated as the first electronic device, and adds information indicating the operation mode and information specifying the first electronic devices to the first protocol data when the operation mode is set in a plural-control mode in which operations of plural first electronic devices are controlled.

(3) The protocol conversion device described in the above (1) or (2), in which the first protocol control unit also starts session connection to the second electronic device when the operation mode is set in the single-device control mode or the plural-device control mode, and waits for a request for session connection from the second electronic device when the operation mode is set in the device mode.

(4) A protocol conversion method including transmitting/receiving first protocol data using a first protocol with information corresponding to a set operation mode to/from a first electronic device connected to a relay device and in which connection adjustment is performed by the first protocol by the first protocol control unit, and converting second protocol data received through the relay device from a second electronic device connected to the relay device and in which communication is performed by a second protocol into the first protocol data to transmit the data to the first protocol control unit, and converting the first protocol data received by the first protocol control unit through the relay device into the second protocol data to transmit the data to the second electronic device by the second protocol control unit.

The present disclosure contains subject matter related to that disclosed in Japanese Priority Patent Application JP 2012-090087 filed in the Japan Patent Office on Apr. 11, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A protocol conversion device comprising:
    a first protocol control unit transmitting/receiving first protocol data using a first protocol to/from a first electronic device connected to a relay device and in which connection adjustment is performed by the first protocol;
    a second protocol control unit converting second protocol data received through the relay device from a second electronic device connected to the relay device and in which communication is performed by a second protocol into the first protocol data to transmit the data to the first protocol control unit, and converting the first protocol data received by the first protocol control unit through the relay device into the second protocol data to transmit the data to the second electronic device; and
    a system control unit setting an operation mode of the first protocol control unit and the second protocol control unit, wherein the first protocol control unit and the second protocol control unit are activated and deactivated based on the set operation mode.

2. The protocol conversion device according to claim 1, wherein the first protocol control unit adds information indicating the operation mode to the first protocol data when the operation mode is set in a single-device control mode in which an operation of a single first electronic device is controlled or in a device mode in which the second electronic device is operated as the first electronic device, and adds information indicating the operation mode and information specifying plural first electronic devices to the first protocol data when the operation mode is set in a plural-device control mode in which operations of the plural first electronic devices are controlled.

3. The protocol conversion device according to claim 2, wherein the first protocol control unit also starts session connection to the second electronic device when the operation mode is set in the single-device control mode or the plural-device control mode, and waits for a request for session connection from the second electronic device when the operation mode is set in the device mode.

4. A protocol conversion method comprising:
    transmitting/receiving first protocol data using a first protocol to/from a first electronic device connected to a relay device and in which connection adjustment is performed by the first protocol by a first protocol control unit;
    converting second protocol data received through the relay device from a second electronic device connected to the relay device and in which communication is performed by a second protocol into the first protocol data to transmit the data to the first protocol control unit, and converting the first protocol data received by the first protocol control unit through the relay device into the second protocol data to transmit the data to the second electronic device by a second protocol control unit; and
    setting an operation mode of the first protocol control unit and the second protocol control unit, wherein the first protocol control unit and the second protocol control unit are activated and deactivated based on the set operation mode.

5. A protocol conversion device comprising:
    a first protocol control unit transmitting/receiving first protocol data using a first protocol with information corresponding to a set operation mode to/from a first electronic device in which connection adjustment is performed by the first protocol;
    a second protocol control unit converting second protocol data, received from a second electronic device in which communication is performed by a second protocol, into the first protocol data to transmit the data to the first protocol control unit, and converting the first protocol data received by the first protocol control unit into the second protocol data to transmit the data to the second electronic device; and
    a system control unit setting the operation mode of the first protocol control unit and the second protocol control unit,
        wherein the first protocol control unit adds information indicating the operation mode to the first protocol data when the operation mode is set in a single-device control mode in which an operation of a single first electronic device is controlled or in a device mode in which the second electronic device is operated as the first electronic device, and adds information indicating the operation mode and information specifying plural first electronic devices to the first protocol data when the operation mode is set in a plural-device control mode in which operations of the plural first electronic devices are controlled.

* * * * *